(12) United States Patent
Frankowski (10) Patent No.: US 10,859,141 B2
(45) Date of Patent: Dec. 8, 2020

(54) TENSIONER WITH FIRST AND SECOND DAMPING MEMBERS AND INCREASED DAMPING

(71) Applicant: LITENS AUTOMOTIVE PARTNERSHIP, Woodbridge (CA)

(72) Inventor: Marek Frankowski, Innisfil (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 221 days.

(21) Appl. No.: 15/770,911

(22) PCT Filed: Oct. 27, 2016

(86) PCT No.: PCT/CA2016/051245
§ 371 (c)(1),
(2) Date: Apr. 25, 2018

(87) PCT Pub. No.: WO2017/070784
PCT Pub. Date: May 4, 2017

(65) Prior Publication Data
US 2018/0320764 A1 Nov. 8, 2018

Related U.S. Application Data

(60) Provisional application No. 62/247,610, filed on Oct. 28, 2015, provisional application No. 62/250,742, filed on Nov. 4, 2015.

(51) Int. Cl.
*F16H 7/12* (2006.01)
*F16H 7/08* (2006.01)

(52) U.S. Cl.
CPC ..... *F16H 7/1218* (2013.01); *F16H 2007/081* (2013.01); *F16H 2007/084* (2013.01);
(Continued)

(58) Field of Classification Search
CPC ............... F16H 7/08; F16H 2007/081; F16H 2007/0863; F16H 2007/0865; F16H 7/10;
(Continued)

(56) References Cited

U.S. PATENT DOCUMENTS 1,667,117 A 4/1928 Ireland
2,002,081 A 5/1935 Dow
(Continued)

FOREIGN PATENT DOCUMENTS

CA 2446188 C 6/2007
CN 100540946 C 10/2004
(Continued)

OTHER PUBLICATIONS

European Search Report for corresponding European Patent Application No. 16858537.0 dated Sep. 12, 2019.
(Continued)

*Primary Examiner* — Michael R Mansen
*Assistant Examiner* — Raveen J Dias
(74) *Attorney, Agent, or Firm* — Millman IP Inc.

(57) ABSTRACT

In an aspect, a tensioner includes a shaft and base unit that is mountable to an engine, an arm pivotable about the shaft and base unit, a pulley on the arm engageable with a belt, a spring urging the arm in a free arm direction, a first damping member fixed on the shaft and base unit, which receives a first radial force from a first segment of the spring causing a first amount of frictional force between the first damping member and a surface that moves with the tensioner arm, and a second damping member on the arm, which receives a second radial force from a second segment of the tensioner spring that is spaced axially from the first segment of the spring, causing a second amount of frictional force between the second damping member and a surface that is stationary with the shaft and base unit.

14 Claims, 10 Drawing Sheets

(52) U.S. Cl.
CPC ............. *F16H 2007/0865* (2013.01); *F16H 2007/0893* (2013.01)

(58) Field of Classification Search
CPC ........ F16H 7/12; F16H 7/1209; F16H 7/1218; F16H 2007/0893; F16H 2007/084; F16H 55/36; F16H 55/52; F16H 55/54; F16H 55/56
USPC ................ 474/133, 111, 112, 113, 117, 118
See application file for complete search history.

(56) References Cited

U.S. PATENT DOCUMENTS

| | | |
|---|---|---|
| 2,051,488 A | 8/1936 | Kottlowski et al. |
| 3,528,533 A | 9/1970 | Sacchini |
| 3,618,721 A | 11/1971 | Hare |
| 3,756,091 A | 9/1973 | Miller |
| 3,924,481 A | 12/1975 | Gregg |
| 4,392,840 A | 7/1983 | Radocaj |
| 4,515,577 A | 5/1985 | Cathey et al. |
| 4,553,952 A | 11/1985 | Tangorra et al. |
| 4,824,421 A | 4/1989 | Komorowski |
| 4,917,655 A | 4/1990 | Martin |
| 4,923,435 A | 5/1990 | Kadota et al. |
| 5,011,460 A | 4/1991 | Ouchi et al. |
| 5,052,982 A | 10/1991 | Ouchi |
| 5,156,573 A | 10/1992 | Bytzek et al. |
| RE34,543 E | 2/1994 | Komorowski et al. |
| 5,328,415 A | 7/1994 | Furutani et al. |
| 5,421,788 A | 6/1995 | Toth |
| 5,702,314 A | 12/1997 | Schmid |
| 6,102,820 A | 8/2000 | Imaharu et al. |
| 6,264,578 B1 | 7/2001 | Ayukawa |
| 6,375,588 B1 | 4/2002 | Frankowski et al. |
| 6,416,435 B1 | 7/2002 | Szatkowski et al. |
| 6,422,962 B1 | 7/2002 | Lehtovaara et al. |
| 6,422,963 B2 | 7/2002 | Kurose |
| 6,450,907 B1 | 9/2002 | Serkh |
| 6,468,172 B1 | 10/2002 | Lang et al. |
| 6,592,482 B2 | 7/2003 | Serkh |
| 6,857,977 B1 | 2/2005 | Bertelshofer et al. |
| 6,857,978 B2 | 2/2005 | Polster et al. |
| 7,371,199 B2 | 5/2008 | Joslyn |
| 7,507,172 B2 | 3/2009 | Lehtovaara et al. |
| 7,803,078 B2 | 9/2010 | D'Silva et al. |
| 7,874,950 B2 | 1/2011 | Lehtovaara et al. |
| 8,038,555 B2 | 10/2011 | Pendergrass et al. |
| 8,142,315 B2* | 3/2012 | Dell ................ F16H 7/1281 474/135 |
| 8,613,680 B2 | 12/2013 | Frankowski et al. |
| 8,690,718 B2 | 4/2014 | Cantatore |
| 2003/0078124 A1 | 4/2003 | Serkh |
| 2003/0098215 A1 | 5/2003 | Miller et al. |
| 2004/0053719 A1 | 3/2004 | Gibson |
| 2004/0166975 A1 | 8/2004 | Gibson |
| 2006/0035740 A1 | 2/2006 | Lehtovaara et al. |
| 2008/0026894 A1 | 1/2008 | Dinca et al. |
| 2008/0058141 A1 | 3/2008 | Pendergrass et al. |
| 2008/0058142 A1 | 3/2008 | Joslyn |
| 2008/0058143 A1 | 3/2008 | Fukuda |
| 2008/0139353 A1 | 6/2008 | Stepniak et al. |
| 2008/0287233 A1* | 11/2008 | Cantatore ............ F16H 7/1218 474/112 |
| 2009/0011881 A1 | 1/2009 | Lehtovaara et al. |
| 2009/0131208 A1 | 6/2009 | Hawryluck et al. |
| 2010/0069185 A1 | 3/2010 | Ward et al. |
| 2010/0081529 A1* | 4/2010 | Liebel ................ F16H 7/1218 474/133 |
| 2010/0145559 A1 | 6/2010 | Gauthier et al. |
| 2011/0256969 A1 | 10/2011 | Frankowski et al. |
| 2011/0312454 A1* | 12/2011 | Comsa ................ F16H 7/1281 474/110 |
| 2012/0040789 A1 | 2/2012 | Cantatore |
| 2013/0172137 A1* | 7/2013 | Antchak ................ F16H 7/12 474/133 |
| 2014/0038758 A1* | 2/2014 | Jindai ................ F16H 7/1218 474/135 |
| 2014/0051533 A1* | 2/2014 | Yoneda .................. F16H 7/10 474/113 |
| 2014/0113755 A1 | 4/2014 | Ward et al. |
| 2014/0287858 A1* | 9/2014 | Hao ................ F16H 7/1218 474/133 |
| 2014/0287859 A1* | 9/2014 | Frankowski ............ F16H 7/12 474/135 |
| 2014/0287860 A1* | 9/2014 | Ma .................... F16H 7/08 474/135 |
| 2015/0031484 A1* | 1/2015 | Lindstrom ............ F16H 7/1218 474/117 |
| 2015/0247558 A1* | 9/2015 | Hamers ................ F16H 7/1218 474/117 |
| 2015/0362047 A1* | 12/2015 | Barillet ................ F16H 7/1281 474/135 |
| 2016/0146313 A1* | 5/2016 | Ma .................... F16H 7/1245 474/135 |
| 2016/0215859 A1* | 7/2016 | Frankowski .......... F16H 7/0831 |
| 2018/0363741 A1* | 12/2018 | Dec .................... F16H 7/1281 |
| 2018/0363742 A1* | 12/2018 | Dec .................... F16H 7/1218 |
| 2019/0101192 A1* | 4/2019 | Dec .................... F16H 7/1281 |
| 2019/0107179 A1* | 4/2019 | Wang .................. F16H 7/0848 |

FOREIGN PATENT DOCUMENTS

| | | |
|---|---|---|
| CN | 1959150 A | 6/2006 |
| CN | 101755147 A | 6/2007 |
| CN | 101611242 A | 12/2009 |
| CN | 101846163 A | 9/2010 |
| DE | 3716571 C1 | 1/1989 |
| EP | 450620 A1 | 10/1991 |
| EP | 967412 A2 | 12/1999 |
| EP | 1368583 B1 | 10/2008 |
| EP | 2239483 B1 | 9/2012 |
| JP | 60-52433 U | 4/1985 |
| JP | 2006170435 A1 | 6/2006 |
| JP | 2011202778 A | 10/2011 |
| KR | 10-2002-0029376 A | 4/2002 |
| KR | 1020020029376 A | 4/2002 |
| KR | 10-20050044684 A | 5/2005 |
| KR | 1020050044684 A | 5/2005 |
| WO | 2003048606 A1 | 6/2003 |
| WO | 2006105656 A1 | 10/2006 |
| WO | 2008068782 A1 | 6/2008 |
| WO | 2008149389 A1 | 12/2008 |
| WO | 2013059929 A1 | 5/2013 |
| WO | 2014063228 A1 | 5/2014 |

OTHER PUBLICATIONS

Examination Report for Indian application based on PCT/CA2011/000445 dated Aug. 27, 2018.
Office Action for KR1020187012896 dated Aug. 9, 2018.
Automotive Handbook, Robert Bosch GmbH/Society of Automotive Engineers, p. 78.
Development of Simulation Model for Calculating Loads to Synchronous Drive Belt, Uchida et al., Mar. 1, 1993.
ESR for EP15164688 dated Oct. 29, 2015.
Extended European Search Report of PCT/CA2011/000445 dated Dec. 15, 2017.
International Preliminary Report on Patentability for PCT/CA2011/000445 dated Oct. 23, 2012.
International Preliminary Report on Patentability for PCT/CA2013/000901 dated Apr. 28, 2015.
International Search Report and Written Opinion for PCT/CA2013/000901 dated Feb. 3, 2014.
Notice of Preliminary Rejection of KR10-2012-7027217 dated May 18, 2017.
Notice of Preliminary Rejection of KR10-2012-7027217 dated May 18, 2017—English translation.
Office Action for CN201180019579 dated Feb. 4, 2015.
Office Action for JP2013505285 dated Mar. 2, 2015.
Office Action for CN201380055354 dated Nov. 16, 2016.

(56) References Cited

OTHER PUBLICATIONS

Office Action for CN201380055354 dated Nov. 16, 2016—English translation.
Office Action for CN201380055354 dated Jul. 3, 2017.
Office Action for CN201380055354 dated Jul. 3, 2017—English translation.
Office Action for CN201510201738.9 dated Apr. 27, 2018.
Office Action for CN201510201738.9 dated Apr. 27, 2018—English Translation.
Office Action for U.S. Appl. No. 14/260,282 dated Oct. 18, 2016.
Office Action for CN20168006949.1 dated Jun. 30, 2020.

* cited by examiner

TENSIONER WITH FIRST AND SECOND DAMPING MEMBERS AND INCREASED DAMPING

This application claims the benefit of priority to U.S. Provisional Patent Application No. 62/247,160 filed Oct. 27, 2015, and U.S. Provisional Patent Application No. 62/250,742 filed Nov. 4, 2015, the contents of both of which are incorporated herein in their entirety.

FIELD

This disclosure relates to tensioners and in particular tensioners that operate to tension synchronous endless drive members such as a timing belt on an engine.

BACKGROUND

Tensioners are known devices for maintaining tension in belts (e.g. timing belts) or other endless drive members that are driven by an engine and that are used to drive certain components, such as camshafts. A tensioner typically includes a shaft and base unit that mounts to the engine, a tensioner arm that is pivotable with respect to the base about a pivot axis, a pulley that is mounted on the arm for engagement with the belt, and a spring that acts between the base and the arm to drive the arm into the belt. The direction into the belt (i.e. the direction in which the spring drives the arm) may be referred to as a direction towards a free arm position (i.e. towards a position that the tensioner arm would reach if no belt were present to stop it). This is a direction of lessening spring potential energy. The tensioner arm in general moves in this direction as the belt tension drops. The direction away from the belt (i.e. the direction against the biasing force of the spring) may be referred to as a direction towards a load stop position, and is a direction of increasing spring potential energy. The tensioner arm in general moves in this direction as the belt tension increases. It is known that it is desirable to provide damping on a tensioner in order to assist the tensioner arm in resisting being thrown off a belt (e.g. a timing belt) during sudden increases in belt tension which can accelerate the tensioner arm suddenly towards the load stop position. In at least some applications, however, the damping that is available from a typical prior art tensioner is not sufficient to satisfactorily dampen movement of the tensioner arm. It would therefore be desirable to provide a tensioner that has increased damping relative to typical prior art tensioners.

SUMMARY

In an aspect, a tensioner for an endless drive member on an engine is provided, and includes a shaft and base unit that is mountable to be stationary relative to an engine, a tensioner arm that is pivotable relative to the shaft and base unit about a tensioner arm axis, an endless drive member engagement member on the tensioner arm and engageable with an endless drive member, a tensioner spring that urges the tensioner arm in a free arm direction, a first damping member that is fixed relative to the shaft and base unit, and which receives a first radial force from a first segment of the tensioner spring that causes a first amount of frictional force between the first damping member and a surface that moves with the tensioner arm, and a second damping member that is fixed relative to the tensioner arm, and which receives a second radial force from a second segment of the tensioner spring that is spaced axially from the first segment of the tensioner spring, that causes a second amount of frictional force between the second damping member and a surface that is stationary with the shaft and base unit.

In another aspect, a tensioner for an endless drive member is provided, and includes a first main device member that is mountable to be stationary relative to an engine, a second main device member that is pivotable relative to the first main device member about an axis, wherein the second main device member is engageable with an endless drive member, an endless drive member engagement member on the second main device member and engageable with an endless drive member, a spring that is positioned to apply a spring force between the first and second main device member, a first damping member that is fixed relative to the first main device member, and which receives a first radial force from a first segment of the tensioner spring that causes a first amount of frictional force between the first damping member and a surface that moves with the second main device member; and a second damping member that is fixed relative to the second main device member, and which receives a second radial force from a second segment of the spring that is spaced axially from the first segment of the spring, that causes a second amount of frictional force between the second damping member and a surface that moves with the first main device member.

DETAILED DESCRIPTION OF EXAMPLE EMBODIMENTS

Figure 1:
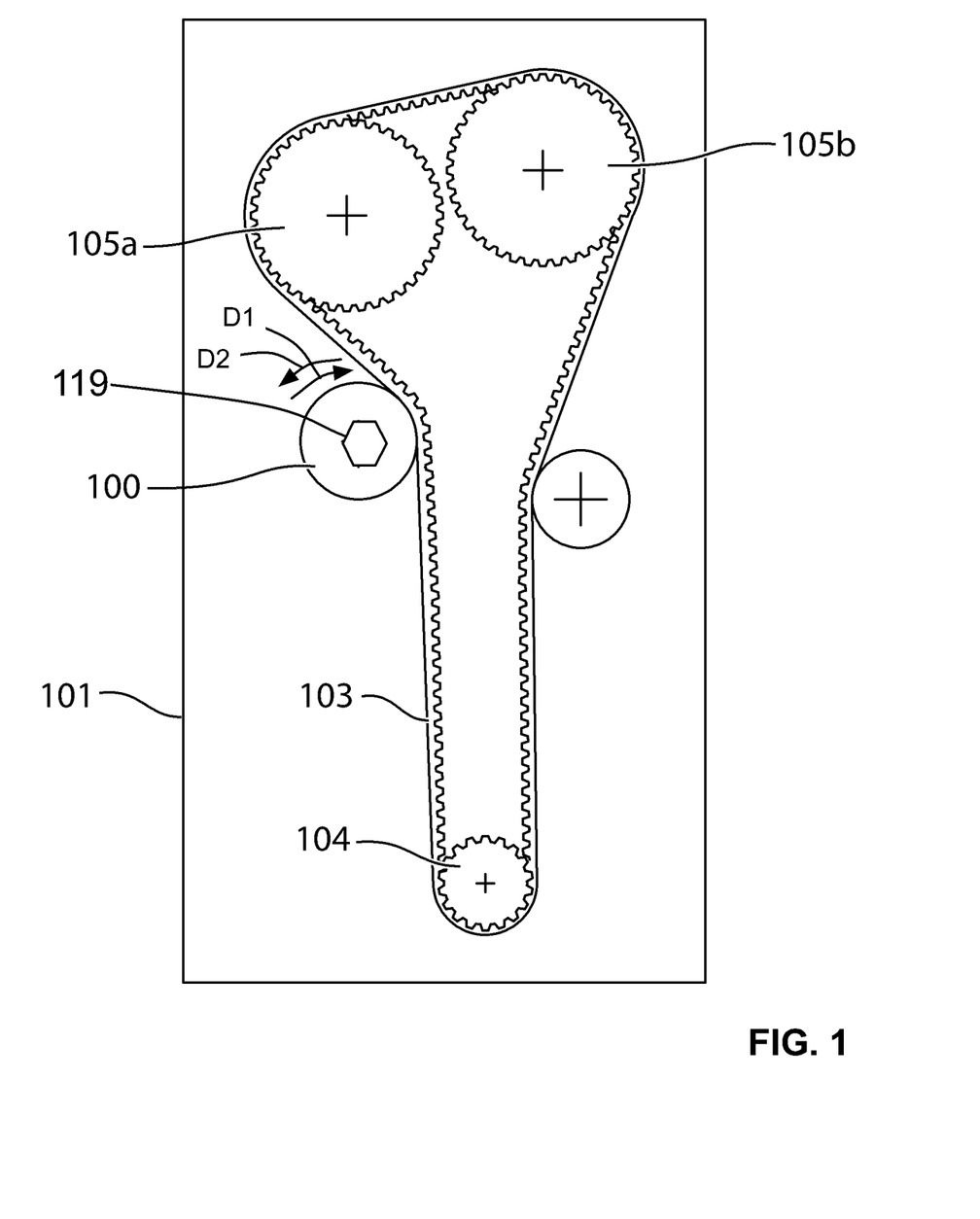
FIG. 1 is an elevation view of an engine, with an endless drive arrangement that incorporates a tensioner in accordance with an embodiment of the present disclosure, incorporating first and second damping members.
Figure 2A:
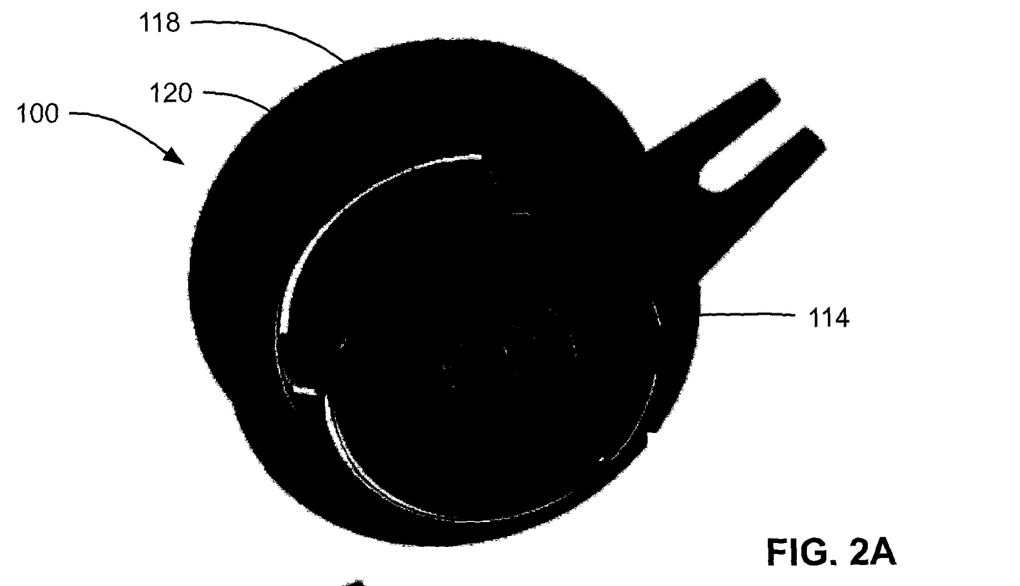
FIG. 2A is a magnified perspective view of the shown in FIG. 1.
Figure 2B:
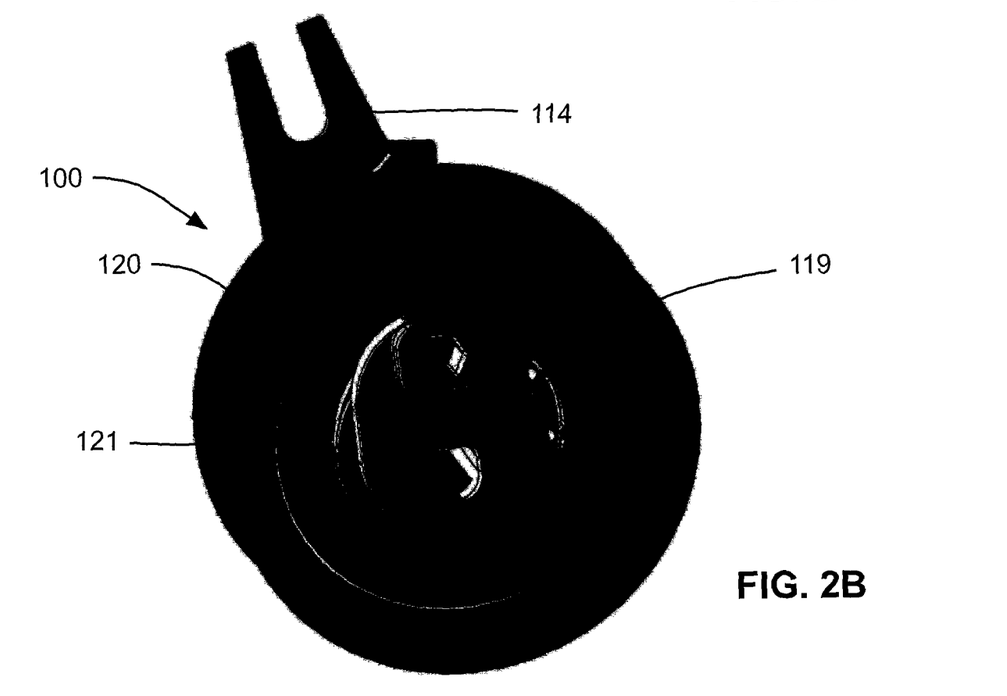
FIG. 2B is another perspective view of the tensioner shown in FIG. 1A.

A tensioner 100 in accordance with an embodiment of the present disclosure is shown in FIGS. 1, 2A and 2B, and provides additional damping as compared to some tensioners of the prior art. The tensioner 100 may be configured to maintain tension in an endless drive member 103 on an engine 101. The endless drive member 103 in the example shown in FIG. 1A is a timing belt, however, the endless drive member may be an accessory drive belt (not shown), or any other suitable non-synchronous or synchronous endless drive member that transfers rotational power from a crankshaft 104 of the engine 101 to one or more driven components such as, for example, a pair of camshafts 105a and 105b. For convenience and readability, the endless drive member 103 may be referred to as the belt 103 or as the timing belt 103, however it will be understood that any suitable endless drive member could be used.

Figure 3A:
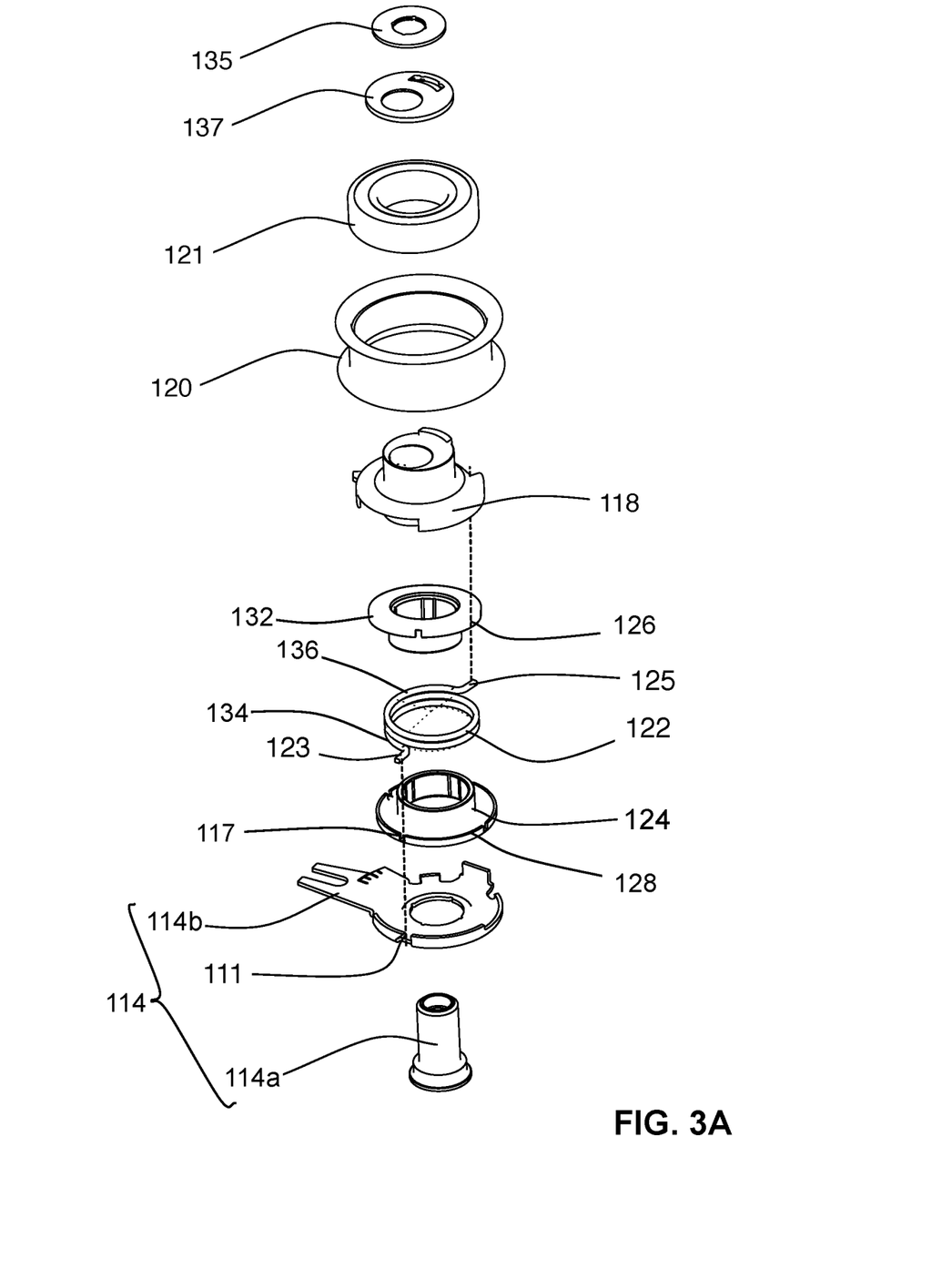
FIGS. 3A and 3B are exploded perspective views of the tensioner shown in FIG. 1.
Figure 3B:
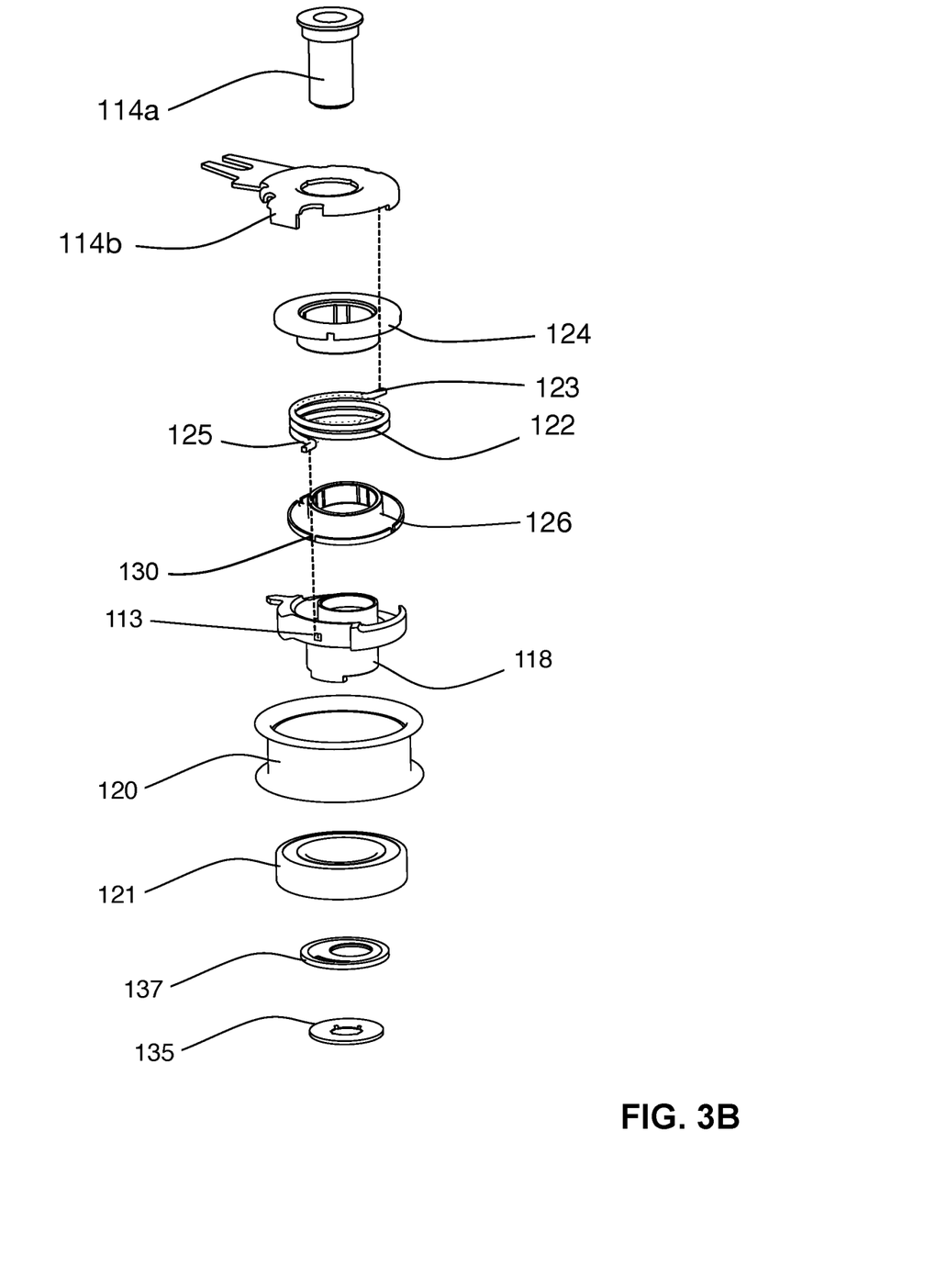

With reference to FIGS. 3A and 3B, the tensioner 100 includes a shaft and base unit 114, a bushing 116, a tensioner arm 118, a pulley 120 that rotates on the tensioner arm 118, a tensioner spring 122, a first damping member 124 and a second damping member 126. The shaft and base unit 114 may include a shaft 114a and a base 114b that are separate from one another but which are integrally connected by any suitable means, such as, for example, by staking. The shaft and base unit 114 is mountable to be stationary relative to the engine 101 by any suitable means. For example, the shaft and base unit 114 may be mountable directly to the engine block as shown in FIG. 1 via a threaded fastener 119, which may be, for example, a bolt.

Figure 4:
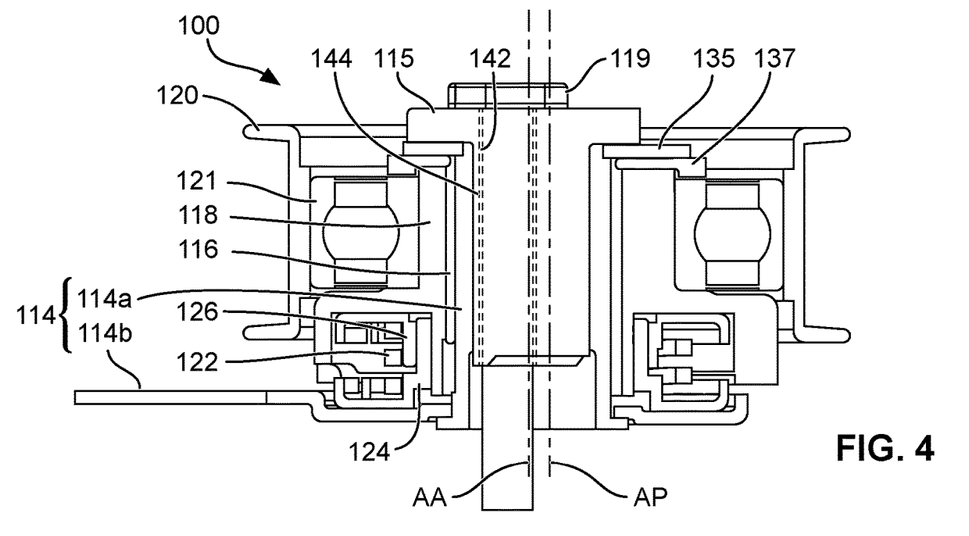
FIG. 4 is a sectional side view of the tensioner shown in FIG. 1.

The shaft and base unit 114 may further include an optional installation eccentric member 115 (not shown in FIGS. 3A and 3B, but shown in FIG. 4). The installation eccentric member 115 has a radially outer surface 144 on which the shaft 114a is pivotably mounted, and a fastener pass-through aperture 146 that receives the threaded fastener 119, and which is eccentrically mounted relative to the outer surface 142. The radially outer surface 142 sets the position of the arm pivot axis AA. The installation eccentric member 115 is pivotable about the fastener 119 to a selected position prior to tightening down of the fastener 119 on the engine block so as to provide some adjustment in the position of the arm pivot axis AA relative to the endless drive member 103.

The tensioner arm 118 is pivotally mounted to the shaft 114a (or more generally, about the shaft and base unit 114) for pivotal movement about a tensioner arm axis AA. Pivotal movement in a first direction D1 (FIG. 1) may be referred to as movement in a free arm direction. Pivotal movement in a second direction D2 (FIG. 1) may be referred to as movement in a load stop direction. The free arm direction and the load stop direction are described above and will be understood by one skilled in the art.

Figure 13:
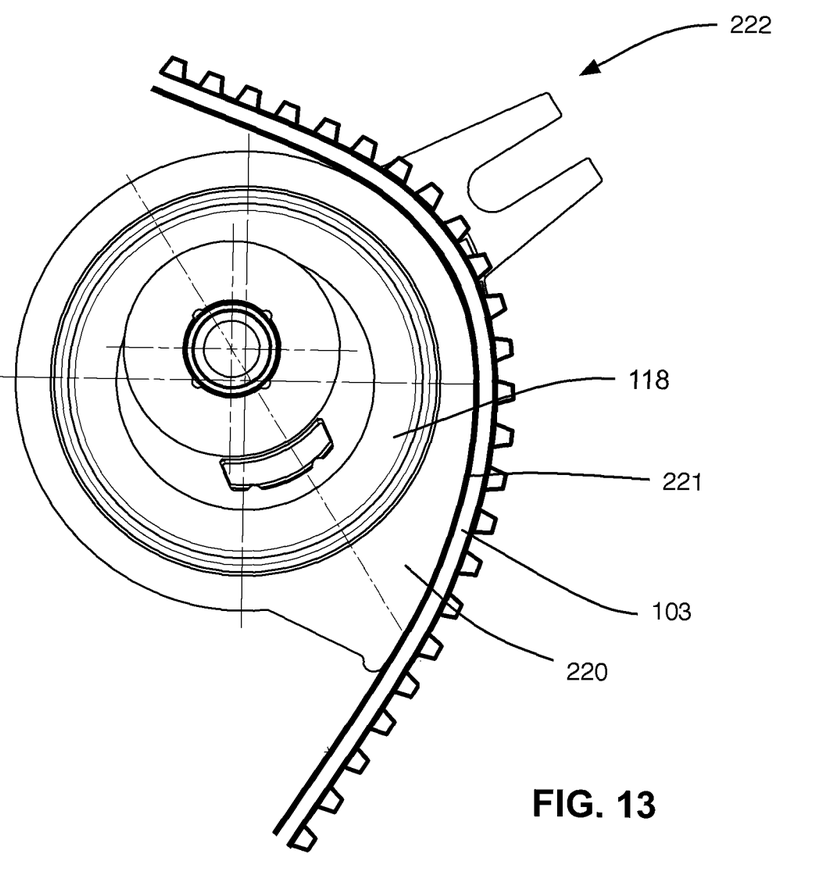
FIG. 13 is a plan view of the tensioner shown in FIG. 1, with a shoe instead of a pulley for engagement with an endless drive member.

The pulley 120 is rotationally mounted to the tensioner arm 118, optionally via a bearing 121 (e.g. a ball bearing shown in FIG. 4), for rotation about a pulley axis AP that is offset from the arm pivot axis AA by a selected offset distance. The pulley 120 is engageable with the endless drive member 103. The pulley 120 is just one example of an endless drive member engagement member that is mountable to the tensioner arm 118 and is engageable with the endless drive member 103. Another example of the endless drive member engagement member that may be used in some embodiments is a shoe 220, such as is shown in FIG. 13, wherein the shoe 220 is fixedly mounted to an outside surface of the tensioner arm 118 and has an endless drive member engagement surface 221 that is engageable with the endless drive member 103. The tensioner shown in FIG. 13 is shown at 222 and may otherwise be similar to the tensioner 100. An example of the shoe 220 and its operation is further described in US2014/0287859, the contents of which are incorporated fully herein by reference.

The tensioner spring 122 (which may more broadly referred to as the spring 122) applies a spring force on the tensioner arm 118 rotationally to urge the tensioner arm in the first rotational direction (i.e. the free arm direction). As shown in FIGS. 2A and 2B, the tensioner spring 122 may be a helical torsion spring and may have a first end 123 and a second end 125, each of which ends in a tang. The tang at the first end 123 engages the base 114b (more particularly it engages a slot 111 in the base 114b) so as to anchor the first end 123 of the spring 122. Additionally, the tang at the first end 123 passes through a slot 117 in a lip 128 of the first damping element 124, thereby rotationally fixing the damping element 124 to the base 114b. In some embodiments, the lip 128 may lack a slot at least initially when installed, and the tang at the first end 123 may simply press axially on the lip 128 with sufficient force that the first damping member 124 is frictionally fixed to the base 114b. Additionally, the force of the tang may be sufficient to form a groove in the lip 128 after some period of time.

The tang at the second end 125 engages the tensioner arm 118 (more particularly it passes through a spring tang aperture 113 in the tensioner arm 118) so as to apply a biasing force urging the tensioner arm 118 into the belt 103. Additionally, the tang at the second end 125 passes through a slot 130 in a lip 132 of the second damping element 126, thereby rotationally fixing the damping element 126 to the tensioner arm 118. In some embodiments, the lip 132 may lack a slot at least initially when installed, and the tang at the second end 125 may simply press down on the lip 132 with sufficient force that the second damping member 126 is frictionally fixed to the tensioner arm 118. Additionally, the axial force of the tang may be sufficient to form a groove in the lip 132 after some period of time.

Through its engagement with the tensioner arm 118 and the shaft and base unit 114, the tensioner spring 122 urges the tensioner arm 118 in the free arm direction, thereby driving the pulley 120 into the timing belt 103, while the belt 103 applies a force on the pulley 120 urging the tensioner arm 118 in the load stop direction, against the urging of the spring 122. In the embodiment shown in FIGS. 2A-8B, the spring 122 may progressively constrict radially under increasing flexure (i.e. as the arm moves in the load stop direction).

The spring 122 may include more than one coil, wherein a coil is a segment of the spring 122 that extends through 360 degrees. In the present example, with reference to FIG. 8B, the spring 122 has 2.5 coils including a first coil 129a which is the coil that includes the first end 123 of the spring 122, a second coil 129b which is the coil that includes the second end 125 of the spring 122. Given that the spring 122 in the example shown in the figures has 2.5 coils in total, there is a 180 degree segment of the spring (shown at 129c) between the first and second coils 129a and 129b. Delimiters between the coils 129a, 129b and the segment 129c are shown at 131.

A retaining washer 135 is staked to a free end of the shaft 114a to hold selected components together. A polymeric bushing plate 137 is provided between the retaining washer 135 and the tensioner arm 118 to prevent metal-to-metal contact therebetween.

The bushing 116 and the damping elements 124 and 126 may all together be included in a damping structure that absorbs some kinetic energy from the belt 103 and converts it to heat through friction between components of the damping structure. The damping structure is advantageous in several respects and is described in further detail below.

The damping elements 124 and 126 may be made from nylon or any other suitable material, such as nylon with a Teflon™ coating on any working surfaces. Materials and coatings may be selected so that damping and wear characteristics may be as desired for a particular application.

Figure 6:
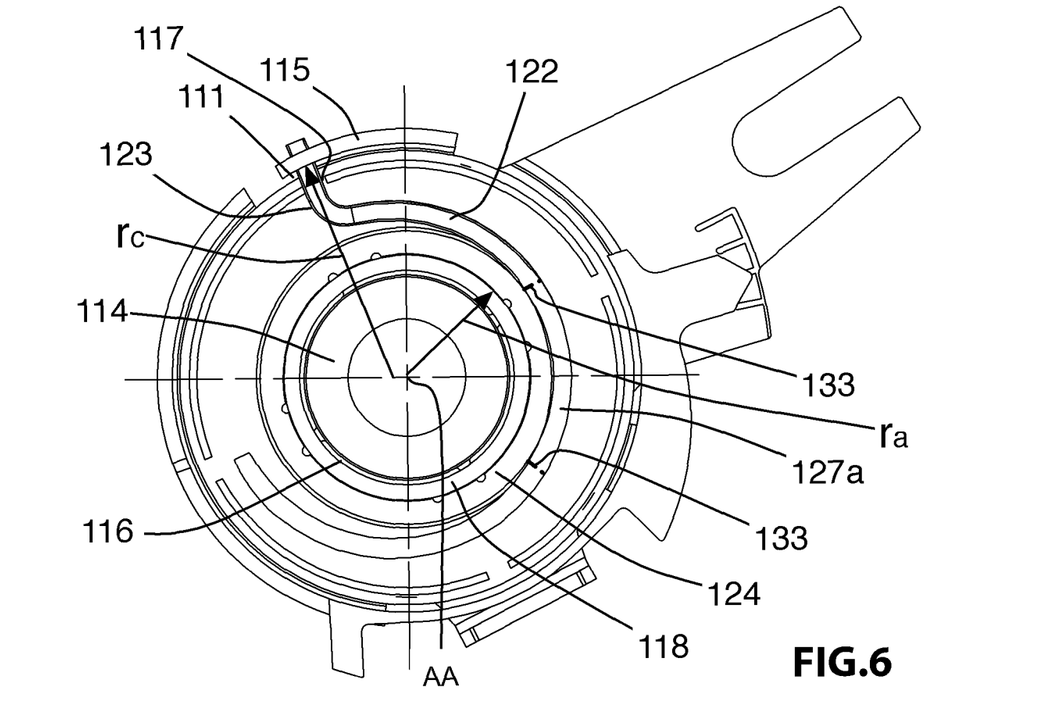
FIG. 6 is a sectional plan view of a proximal portion of the tensioner shown in FIG. 1.
Figure 7:
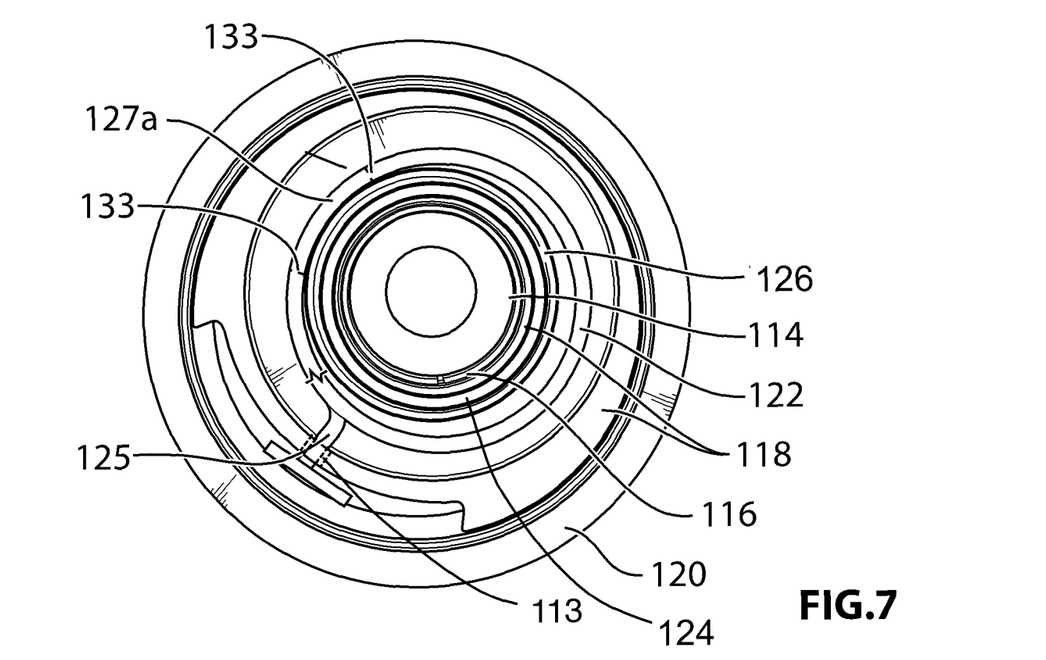
FIG. 7 is a sectional plan view of a distal portion of the tensioner shown in FIG. 1.
Figure 8A:
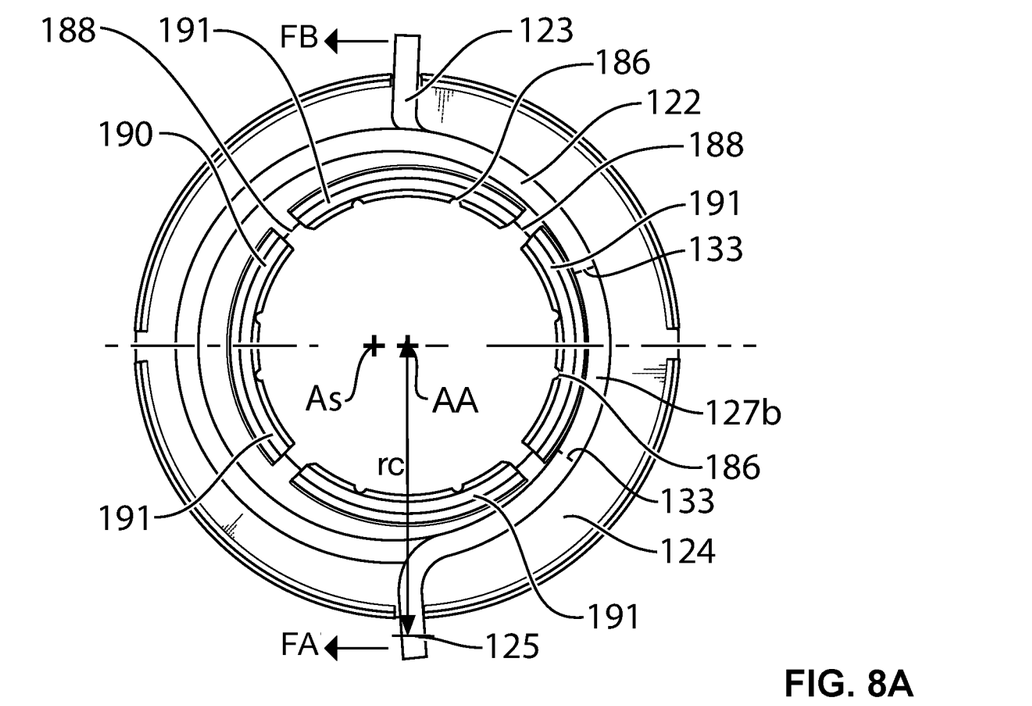
FIG. 8A is a plan view of selected components from the tensioner shown in FIG. 1.

FIG. 6 is a sectional view of a 'bottom' or 'proximal' portion of the tensioner 100 that contacts the engine. FIG. 7 is a sectional view of an 'upper' or 'distal' portion of the tensioner 100. FIG. 8 is a plan view of the spring 122 and the damping element 124. FIG. 8A is a perspective view of the spring 122 alone.

Figure 8B:
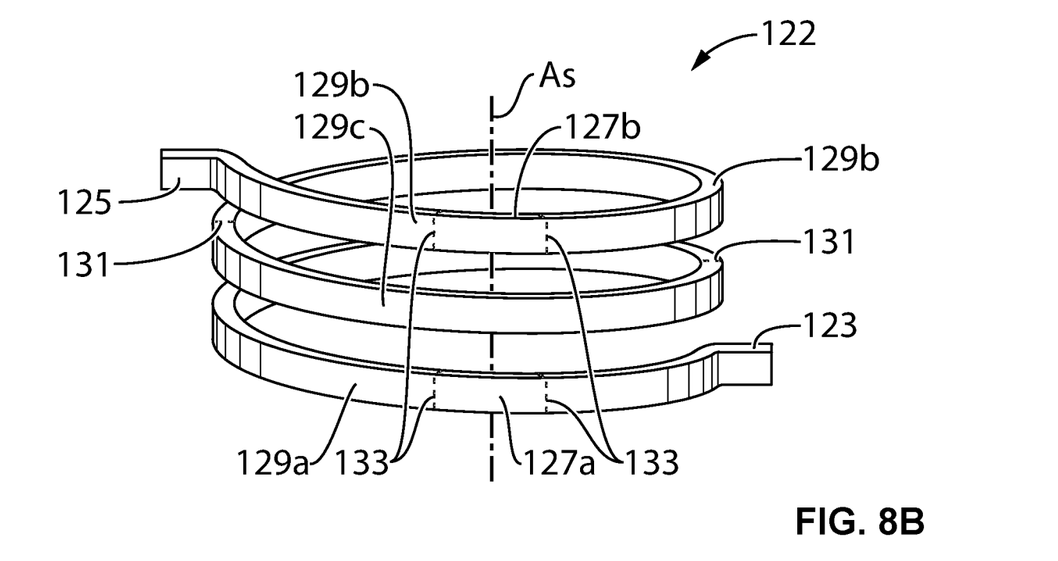
FIG. 8B is a perspective view of a spring from the tensioner shown in FIG. 1.

Referring to FIGS. 6, 7, 8A and 8B, the first and second damping members 124 and 126 are positioned such that a first segment 127*a* of the first end coil 129*a* engages the first damping member 124 and such that a second segment 127*b* in the second end coil 129*b* engages the second damping member 126. The segments 127*a* and 127*b* are shown in a perspective view in FIG. 8B. In FIG. 6, only a portion of the spring 122 is shown so that the segment 127*a* is not obstructed. In FIG. 7, a different portion of the spring 122 is shown so that the segment 127*b* can be seen unobstructed. As can be seen in FIGS. 6, 7 and 8B, delimiters shown at 133 show the extents of the segments 127*a* and 127*b* (i.e. they show the ends of the portions of the spring 122 that contact the first and second damping members 124 and 126). As can be seen, the first segment 127*a* and the second segment 127*b* are axially offset or spaced from one another, and are in the first end coil 129*a* and second end 129*b*, respectively. Also, as can be seen in FIG. 8B, the first and second segments 127*a* and 127*b* are generally aligned axially.

As shown in FIG. 8A, a force FA (at a distance rc (i.e. a radius rc) from the arm pivot axis AA) is exerted on the second end 125 of the spring 122 by the tensioner arm 118 during engagement with the belt 103. This force FA results in a reaction force FB by the shaft and base unit 114 on the first end 123 of the spring 122 so that the torques acting on the arm 118 are in equilibrium. The force FB on the first spring end 123 results in a first radially-directed force F1 (FIG. 5) acting from the first segment 127*a* of the spring 122 on a radially outer surface of the first damping member 124. A radially-directed force may simply be referred to as a radial force, for ease of reading. This first radial force F1, which may be substantially the same magnitude as the force FB, directly results in a first amount of frictional force FF1 between the first damping member 124 and a surface 152 that moves with the tensioner arm 118 (and which is, in the present example, on the tensioner arm 118), at a distance ra (i.e. a radius ra) from the axis AA. The force FA on the second end 125 results in a second radial force F2 acting from the second segment 127*b* of the spring 122 on a radially outer surface of the second damping member 126. This second radial force F2, which may be substantially the same magnitude as the force FA, directly results in a second amount of frictional force FF2 between the second damping member 126 and a surface 154 that moves with the shaft and base unit 114 (and which is, in the present example, on the first damping member 124). Furthermore, the second radial force F2 results in a third radial force F3 being transmitted by the second damping member 126 on the first damping member 124, which results in a third amount of frictional force FF3 between the first damping member 124 and the surface 152 that moves with the tensioner arm 118. As a result, the overall frictional force (and therefore damping force) generated by the first and second damping members 124 and 126 is significantly higher than is present in some tensioners of the prior art. This is based on the assumption that the force forces FB and FA that is exerted at the two ends 123 and 125 of the spring 122 are approximately in the same direction, which is true when the spring ends 123 and 125 are approximately 180 degrees apart angularly about the spring axis, shown at As (FIG. 8A). As can be seen in FIG. 8A, when the spring ends 123 and 125 are 180 degrees apart, the forces F on the spring ends 123 and 125 are aligned and are purely additive. When they are at some other angle relative to each other, the forces FB and FA are not purely additive and vector components of the forces FB and FA must be considered to determine the overall force exerted on the first and second damping members 124 and 126.

As noted above the first spring end 123 is stationary with the shaft and base unit 114 and the second spring end 125 moves with the tensioner arm 118. Thus, there is relatively little frictional movement generated between the first spring segment 129*a* and the first damping member 124, and relatively little frictional movement generated between the second spring segment 129*b* and the second damping member 126. As a result, there is less potential for wear on the surfaces of the first and second damping members 124 and 126 that engage the spring 122 as compared to some tensioners of the prior art where there is significant frictional movement between the spring and the adjacent damping member.

The additional damping provided by the embodiment shown in FIG. 4 may permit the use of a longer arm tensioner than is possible with some prior art tensioners. It may also permit the tensioner 100 to be used in a belt-in-oil application, in either a short-arm or long-arm configuration.

It will be noted that, while the spring 122 constricts during operation and applies a compressive force on the damping element 124 it may push oil away (in a helical direction—along the length of the spring coils) from the contact area between the spring 122 and the damping element 124. As a result, the presence of oil may not cause a large reduction in friction between the spring 122 and the damping element 124. It will also be noted that, while the spring 122 may be made from a spring wire having a square or rectangular cross-section, the wire may twist by some angle during operation and thus may engage the damping element at some points along a corner of the cross-sectional shape and not along a flat face of the cross-sectional shape. This will reduce by some amount lubricating effects of any oil that is present that would reduce the friction between the spring 122 and the damping element 124.

In other embodiments, the spring 122 may be of the type that expands radially under increasing flexure from movement of the arm 118 in the load stop direction. In such embodiments, the damping members 124 and 126 may be positioned radially outside of the spring 122 instead of being positioned radially inside the spring 122 as they are in the embodiments shown in the figures.

Figure 9:
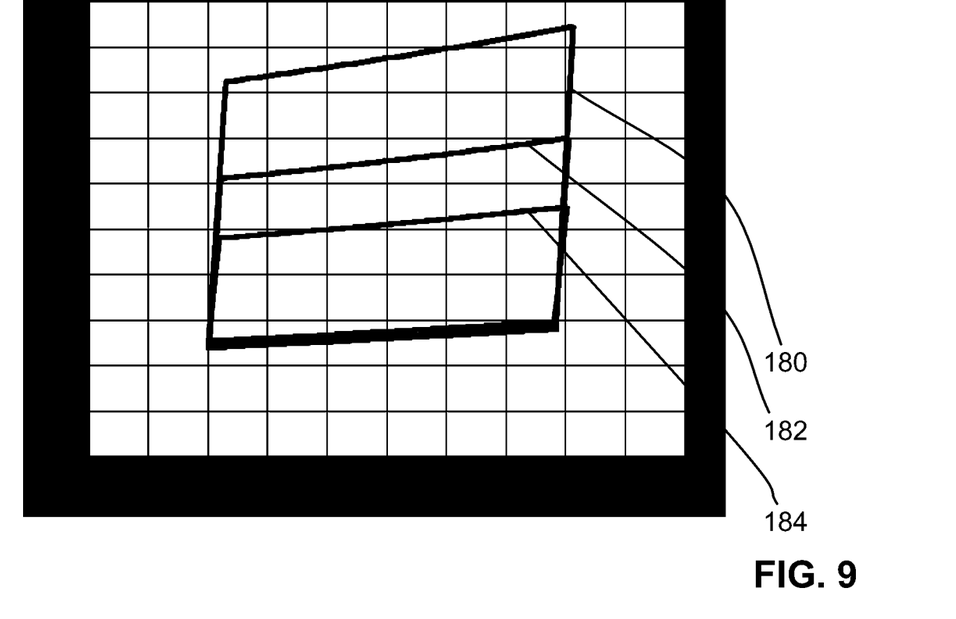
FIG. 9 is a graph illustrating the tension/displacement relationship for an example of the tensioner shown in FIGS. 1A-3, and two tensioners of the prior art.
Figure 10:
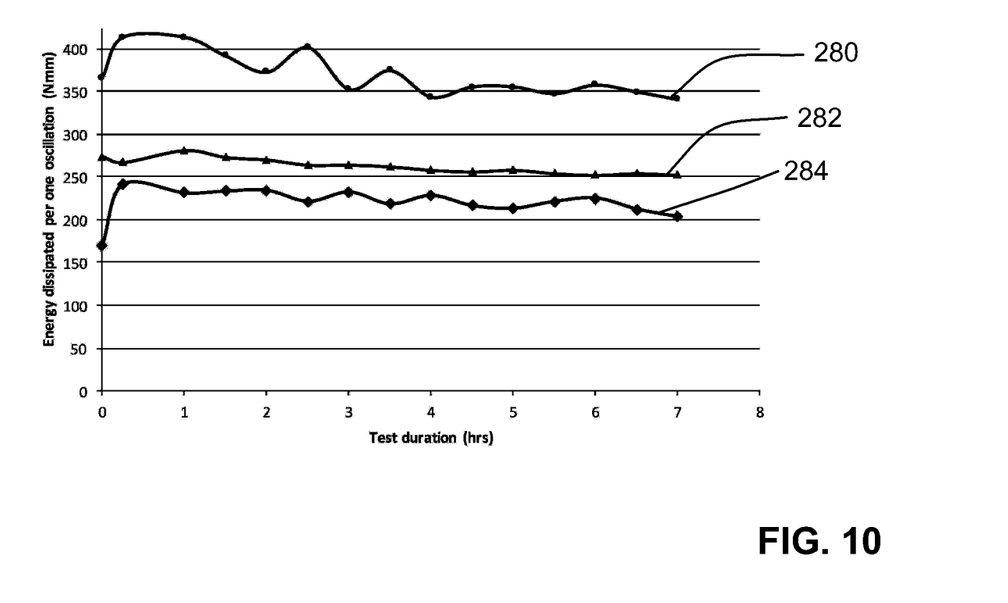
FIG. 10 is a graph illustrating the relative amounts of damping that are provided by an example of the tensioner shown in FIGS. 1A-3, and two tensioners of the prior art.

The performance of the tensioner 100 relative to the tensioner 10 is shown in FIG. 9, which shows a hysteresis curve 180 for the tensioner 100, a hysteresis curve 182 for a tensioner as shown in FIG. 4 of US2014/0287859 and a hysteresis curve 184 for a tensioner with no damping element as shown in FIG. 1 of US2014/0287859. It will be understood that the taller the hysteresis curve, the more damping that is provided by the tensioner. Therefore, it can be seen that the tensioner 100 provided higher damping than either of the other tensioners represented in FIG. 9. FIG. 10 shows curves that illustrate the amount of energy can be dissipated by the three tensioners represented in FIG. 9 per oscillation, over time. The curve shown at 280 represents the tensioner 100, the curve 282 represents the tensioner shown in FIG. 4 of US2014/0287859 and the curve 284 represents the tensioner shown in FIG. 1 of US2014/0287859.

In applications where the friction surfaces will be exposed to oil, features may be provided to assist in removing oil from them so as to reduce the risk of sudden drops in friction and damping that can occur from the presence of oil. Slits (which may be referred to as channels or grooves) shown at 186 in FIG. 8A in the damping element 124 are designed to provide oil reservoirs or transport channels to help to transfer oil out from contacting surfaces between the damping element 124 and the arm 118 (not shown in FIG. 9). The channels 186 may be provided with sharp edges which can scrape oil from the surface of the arm 118 to reduce the risk of development of an oil film between the contacting surfaces of the damping element 124 and the arm 118. The presence of the channels 186 reduces the overall contact area between the damping element 124 and the arm 118, which increases the surface pressure between them. The size and/or number of the channels 186 can be selected to provide a selected surface pressure that may be high enough to squeeze oil out from between the contacting surfaces.

Another feature that may be provided on the damping element 124 may be reductions in wall thickness 188, which may be referred to as flex joints 188. The flex joints 188 increase the flexibility of the damping element wall (shown in FIG. 8A at 190) which increases the contact area between the wall 190 and the tensioner arm 118 which in turn makes for less wear and more stable friction between them. These flex joints 188 can be provided any suitable way. For example, the flex joints 188 may extend axially along the axial length of the damping element wall 190. They may, in some embodiments, be provided on the face of the wall 190 that faces the arm 118. In the embodiment shown in FIG. 8A, it can be seen that the flex joints 188 are formed by slots that pass through the entirety of the wall thickness and which extend substantially along the entire axial length of the damping element 124 and which are closed at a first end 188a and open at a second end 188b. As can be seen in FIG. 8A in particular, these slots separate a portion of the damping element 124 into segments shown at 191.

The tensioner 100 can provide good damping even in the presence of oil facilitates its use in a belt-in-oil arrangement, as a replacement for a timing chain design on an engine. For greater certainty however, it will be noted that the tensioner 100 may also be advantageous in applications where no oil is present.

While a spring 122 having 2.5 coils in helical length is shown in the figures, it will be understood that the spring 122 could have fewer or more than 2.5 coils, as noted above. For example, the spring 122 could have 1.5 coils and still have ends that are 180 degrees apart angularly, and would still have two segments that engage the damping element 124. In another example, the spring 122 could have 1.25 coils of helical length and would have ends that are 90 degrees apart angularly, while still having two segments that engage the damping element, although the forces applied at the spring ends would add in a vector sum of about 1.4 F in such an instance. Other spring lengths are possible, such that three, four or any suitable number of segments of the spring 122 would engage a suitably lengthened version of the damping element 124.

Figure 5:
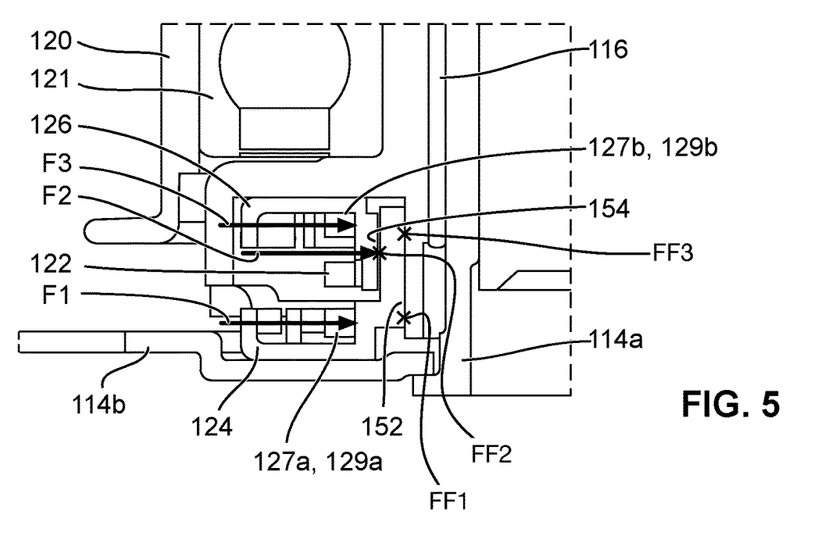
FIG. 5 is a highly magnified sectional side view of the tensioner shown in FIG. 4, showing forces acting on the first and second damping members.

In the embodiment shown in FIGS. 4 and 5, the first damping member 124 directly radially engages a radially outer face of the tensioner arm 118, the second damping member 126 directly radially engages a radially outer face of the first damping member 124, and the tensioner spring 122 directly radially engages both the first and second damping members 124 and 126.

Figure 11:
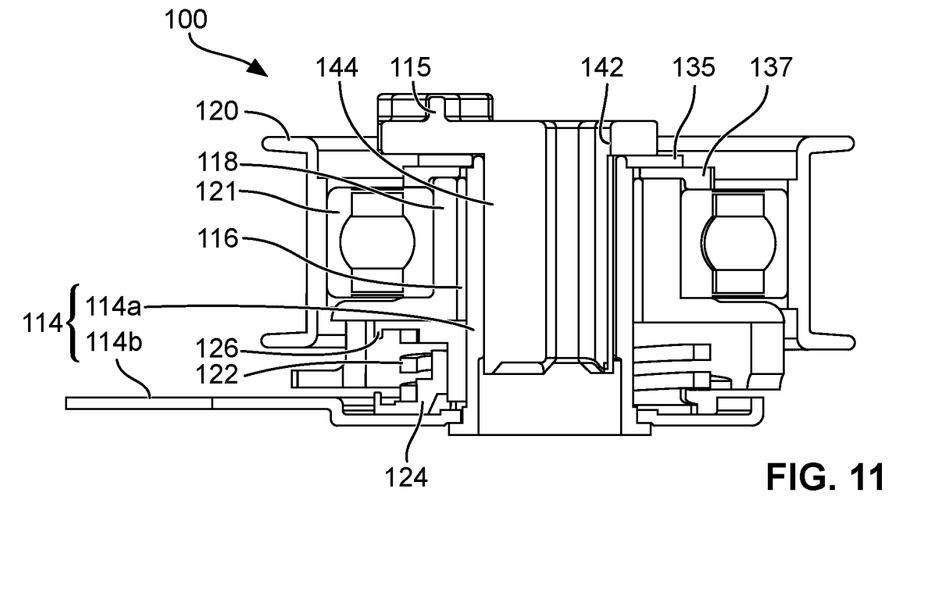
FIG. 11 is a sectional side view of the tensioner shown in FIG. 1, with an alternative arrangement of first and second damping members.
Figure 12:
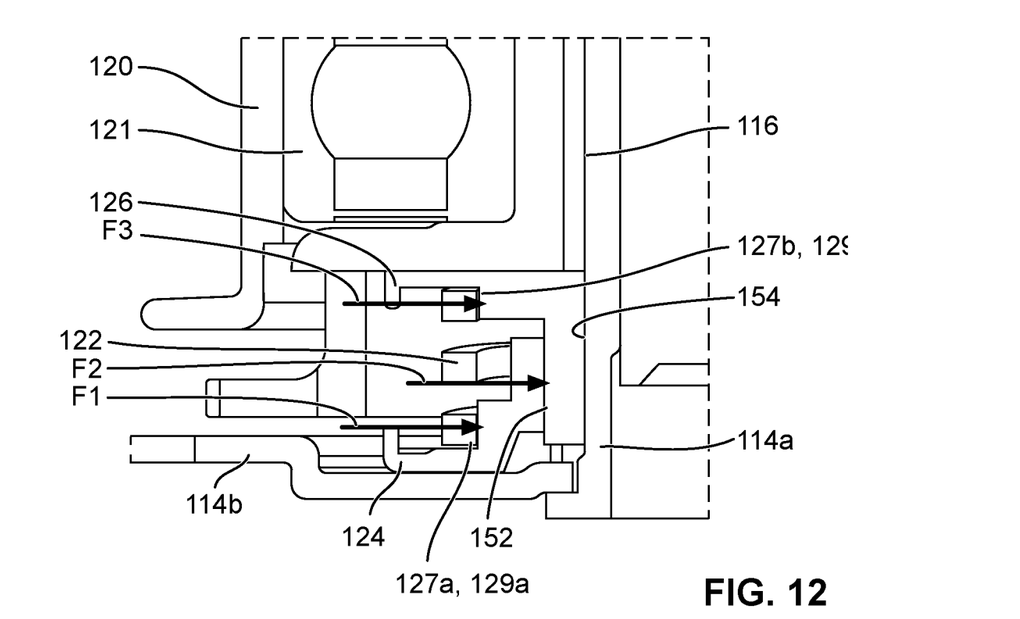
FIG. 12 is a highly magnified sectional side view of the tensioner shown in FIG. 11, showing forces acting on the first and second damping members.

An alternative embodiment of the tensioner 100 is shown in FIGS. 11 and 12, wherein the second damping member 126 directly radially engages a radially outer face of the shaft and base unit 114, the first damping member 124 directly radially engages a radially outer face of the second damping member 126, and the tensioner spring 122 directly radially engages both the first and second damping members 124 and 126. The tensioner 100 shown in FIGS. 11 and 12 may otherwise be similar to the tensioner 100 shown in FIGS. 4 and 5.

In the embodiment shown in FIGS. 11 and 12, the force on the first spring end 123 (FIG. 8B) again results in a first radially-directed force F1 acting from the first segment 127a of the spring 122 on a radially outer surface of the first damping member 124, which directly results in a first amount of frictional force FF1 between the first damping member 124 and a surface 152 that moves with the tensioner arm 118 (and which is, in this example, on the second damping member 126). The force on the second end 125 (FIG. 8B) results in a second radial force F2 acting from the second segment 127b of the spring 122 on a radially outer surface of the second damping member 126. This second radial force F2, which may be substantially the same magnitude as the force on each of the spring ends 123 and 125, directly results in a second amount of frictional force FF2 between the second damping member 126 and a surface 154 that moves with the shaft and base unit 114 (and which is, in the present example, directly on the shaft and base unit 114). Furthermore, the second radial force F2 results in a third radial force F3 being transmitted by the second damping member 126 on the first damping member 124, which results in a third amount of frictional force FF3 between the first damping member 124 and the surface 152 that moves with the tensioner arm 118. As a result, the overall frictional force (and therefore damping force) generated by the first and second damping members 124 and 126 is significantly higher than is present in some tensioners of the prior art.

Providing the tensioner 100 which has a spring 122 with first and second axially spaced segments in contact with first and second damping elements 124 and 126 that are associated with the shaft and base unit 114 and the tensioner arm 118 provides several advantages. It can be seen that, because the first damping member 124 is stationary with the shaft and base unit 114, and because the first spring end 123 is also stationary with the shaft and base unit 114, there is relatively little relative sliding movement of any portion of the first coil 134 with the outer surface of the first damping member 124, which reduces the likelihood that the first coil 134 will wear a groove into the first damping member 124 over time. Similarly, because the second damping member 126 moves with the tensioner arm 118, and because the second spring end 125 also moves with the tensioner arm 118, there is relatively little relative sliding movement of any portion of the second coil 136 with the outer surface of the second damping member 126, which reduces the likelihood that the second coil 136 will wear a groove into the second damping member 126 over time.

Another advantage is that, as noted above, the overall damping force exerted by the first and second damping members 124 and 126 is larger than in certain prior art tensioners due to the fact that one of the first and second damping members 124 or 126 receives a radial force from both the first and second coils 134 and 136 which generates the friction force between the first or second damping member 124 or 126 and the shaft and base unit 114 or the arm 118, and the fact that the other of the first and second damping members 124 or 126 receives a radial force from one of the first and second spring coils 134 or 136, as described above, which generates the friction force between the first and second damping members 124 and 126. The resulting improvement in the total amount of damping that occurs, in comparison with certain prior art damping structures, can facilitate the use of the tensioner 100 in a belt-in-oil application and/or the use of a longer arm tensioner than is possible using some damping structures of the prior art.

The tensioner 100 described above is but an example of a device that is engageable with an endless drive member on an engine. The shaft and base member 114 is but an example of a first main device member that is mountable to be stationary relative to an engine. The tensioner arm 118 is but an example of a second main device member that is pivotable relative to the first main device member about an axis and which is engageable with an endless drive member. In some other embodiments, the device could be, for example, an isolator that is mounted to the crankshaft or to an accessory drive shaft on an accessory drive of an engine, and which incorporates a helical torsion spring that is similar to the spring 122. The first main device member could, in such an embodiment, be a shaft adapter that mounts to a first point relative to an engine (e.g. to one of the aforementioned shafts), and the second main device member could be a pulley that directly drives or is driven by an accessory drive belt. It has been found that damping in isolators can be helpful. Alternatively, the device may be a decoupler which is similar to an isolator but which also incorporates a one way clutch such as a wrap spring clutch.

In another embodiment, the device could be an accessory drive tensioner that typically has a relatively longer distance between the pulley axis AP and the arm pivot axis AA and is used to maintain tension in an accessory drive belt.

The above-described embodiments are intended to be examples only, and alterations and modifications may be carried out to those embodiments by those of skill in the art.

The invention claimed is:

1. A tensioner for an endless drive member on an engine, comprising:
   a shaft and base unit that is mountable to be stationary relative to the engine;
   a tensioner arm that is pivotable relative to the shaft and base unit about a tensioner arm axis;
   an endless drive member engagement member on the tensioner arm and engageable with the endless drive member;
   a tensioner spring that urges the tensioner arm in a free arm direction;
   a first damping member that is fixed relative to the shaft and base unit, and which receives a first radial force from a first segment of the tensioner spring that causes a first amount of frictional force between the first damping member and a surface that moves with the tensioner arm; and
   a second damping member that is fixed relative to the tensioner arm, and which receives a second radial force from a second segment of the tensioner spring that is spaced axially from the first segment of the tensioner spring, that causes a second amount of frictional force between the second damping member and a surface that is stationary with the shaft and base unit,
   wherein the surface that moves with the tensioner arm is on the tensioner arm, and
   wherein the surface that is stationary with the shaft and base unit is on the first damping member,
   wherein the first damping member receives a third radial force from the second segment of the tensioner spring that causes a third amount of frictional force between the first damping member and the surface that moves with the tensioner arm, such that a total frictional force between the first damping member and the surface that moves with the tensioner arm is contributed to by the first and third radial forces.

2. A tensioner as claimed in claim 1, wherein the first damping member directly radially engages a radially outer face of the tensioner arm, the second damping member directly radially engages a radially outer face of the first damping member, and the tensioner spring directly radially engages both the first and second damping members.

3. A tensioner as claimed in claim 1, wherein the tensioner spring is a helical torsion spring.

4. A tensioner as claimed in claim 1, wherein the first segment of the tensioner spring has a first spring end that is fixed relative to the shaft and base unit and the second segment of the tensioner spring has a second spring end that is fixed relative to the tensioner arm.

5. A tensioner as claimed in claim 1, wherein the endless drive member engagement member is a pulley that is rotatable about a pulley axis that is offset from the tensioner arm axis.

6. A tensioner for an endless drive member on an engine, comprising:
   a shaft and base unit that is mountable to be stationary relative to the engine;
   a tensioner arm that is pivotable relative to the shaft and base unit about a tensioner arm axis;
   an endless drive member engagement member on the tensioner arm and engageable with the endless drive member;
   a tensioner spring that urges the tensioner arm in a free arm direction;
   a first damping member that is fixed relative to the shaft and base unit, and which receives a first radial force from a first segment of the tensioner spring that causes a first amount of frictional force between the first damping member and a surface that moves with the tensioner arm; and
   a second damping member that is fixed relative to the tensioner arm, and which receives a second radial force from a second segment of the tensioner spring that is spaced axially from the first segment of the tensioner spring, that causes a second amount of frictional force between the second damping member and a surface that is stationary with the shaft and base unit,
   the surface that moves with the tensioner arm is on the second damping member, and
   wherein the surface that is stationary with the shaft and base unit is on the shaft and base unit,
   wherein the second damping member receives a third radial force from the first segment of the tensioner spring that causes a third amount of frictional force between the second damping member and the surface that is stationary with the shaft and base unit, such that a total frictional force between the second damping member and the surface that is stationary with the shaft and base unit is contributed to by the second and third radial forces.

7. A tensioner as claimed in claim 6, wherein the second damping member directly radially engages a radially outer face of the shaft and base unit, the first damping member directly radially engages a radially outer face of the second damping member, and the tensioner spring directly radially engages both the first and second damping members.

8. A device that is engageable with an endless drive member on an engine, comprising:
a first main device member that is mountable to a first point relative to the engine;
a second main device member that is pivotable relative to the first main device member about an axis;
an endless drive member engagement member on the second main device member and engageable with the endless drive member;
a spring that is positioned to apply a spring force between the first and second main device members;
a first damping member that is fixed relative to the first main device member, and which receives a first radial force from a first segment of the spring that causes a first amount of frictional force between the first damping member and a surface that moves with the second main device member; and
a second damping member that is fixed relative to the second main device member, and which receives a second radial force from a second segment of the spring that is spaced axially from the first segment of the spring, that causes a second amount of frictional force between the second damping member and a surface that moves with the first main device member,
wherein the surface that moves with the second main device member is on the second main device member, and
wherein the surface that moves with the first main device member is on the first damping member,
wherein the first damping member receives a third radial force from the second segment of the spring that causes a third amount of frictional force between the first damping member and the second main device member, such that a total frictional force between the first damping member and the second main device member is contributed to by the first and third radial forces.

9. A device as claimed in claim 8, wherein the first main device member is a shaft and base unit that is mountable to be stationary relative to the engine, and wherein the second main device member includes a tensioner arm that is pivotable relative to the shaft and base unit about the axis, and wherein the endless drive member engagement member is a pulley that is rotatable about a pulley axis that is offset from the axis.

10. A device as claimed in claim 8, wherein the first damping member directly radially engages a radially outer face of the second main device member, the second damping member directly radially engages a radially outer face of the first damping member, and the spring directly radially engages both the first and second damping members.

11. A device as claimed in claim 8, wherein the spring is a helical torsion spring.

12. A device as claimed in claim 8, wherein the first segment of the spring has a first spring end that is fixed relative to the first main device member and the second segment of the spring has a second spring end that is fixed relative to the second main device member.

13. A device that is engageable with an endless drive member on an engine, comprising:
a first main device member that is mountable to a first point relative to the engine;
a second main device member that is pivotable relative to the first main device member about an axis;
an endless drive member engagement member on the second main device member and engageable with the endless drive member;
a spring that is positioned to apply a spring force between the first and second main device members;
a first damping member that is fixed relative to the first main device member, and which receives a first radial force from a first segment of the spring that causes a first amount of frictional force between the first damping member and a surface that moves with the second main device member; and
a second damping member that is fixed relative to the second main device member, and which receives a second radial force from a second segment of the spring that is spaced axially from the first segment of the spring, that causes a second amount of frictional force between the second damping member and a surface that moves with the first main device member,
wherein the surface that moves with the second main device member is on the second damping member, and
wherein the surface that moves with the first main device member is on the first device member,
wherein the second damping member receives a third radial force from the first segment of the spring that causes a third amount of frictional force between the second damping member and the first main device member, such that a total frictional force between the second damping member and the first main device member is contributed to by the second and third radial forces.

14. A device as claimed in claim 13, wherein the second damping member directly radially engages a radially outer face of the first main device member, the first damping member directly radially engages a radially outer face of the second damping member, and the spring directly radially engages both the first and second damping members.

* * * * *